R. ERDLY.
Corn Planter.
No. 108,468. Patented Oct. 18, 1870.
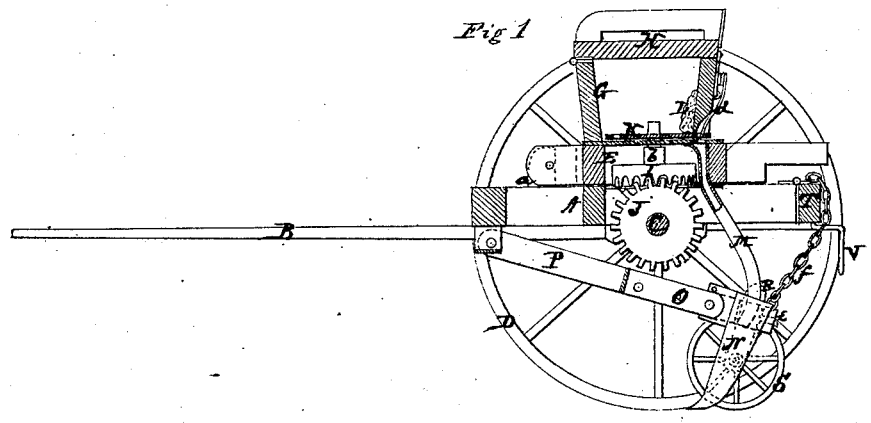
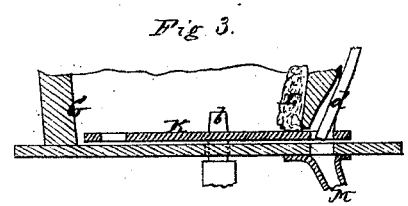
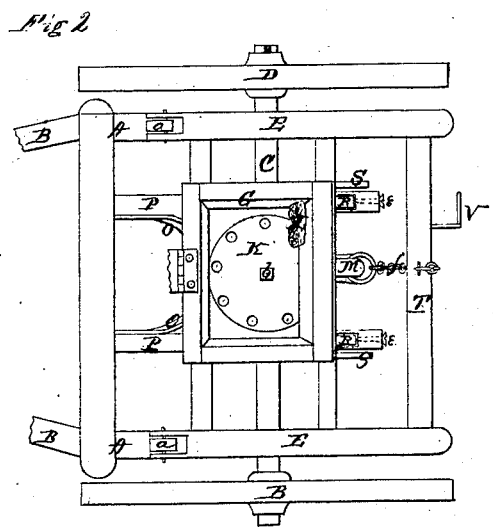
Witnesses.
Harry King.
Ed. Evert.
Inventor.
Robert Erdly
per Alexander Mason
Attys.

United States Patent Office.

ROBERT ERDLY, OF SELIN'S GROVE, PENNSYLVANIA.

Letters Patent No. 108,468, dated October 18, 1870.

IMPROVEMENT IN CORN-PLANTERS.

The Schedule referred to in these Letters Patent and making part of the same.

*To all whom it may concern:*

Be it known that I, ROBERT ERDLY, of Selin's Grove, in the county of Snyder and in the State of Pennsylvania, have invented certain new and useful Improvements in Corn-Planter; and do hereby declare that the following is a full, clear, and exact description thereof, reference being had to the accompanying drawing and to the letters of reference marked thereon, making a part of this specification.

The nature of my invention consists in the construction and arrangement of a corn-planter, as will hereinafter be fully set forth.

In order to enable others skilled in the art to which my invention appertains to make and use the same, I will now proceed to describe its construction and operation, referring to the annexed drawing, in which—

Figure 1 is a longitudinal vertical section of my machine;

Figure 2 is a plan view of the same; and

Figure 3 is an enlarged vertical section of the corn-box or hopper.

A represents the frame of my machine, to which the shafts B B are attached.

This frame is placed on the axle C, on each end of which is a wheel, D.

One or both of these wheels is keyed onto the axle C, so that the axle will rotate with the wheels.

At suitable points on the main frame A are two ears $a$ $a$, projecting upward, to which is hinged an additional frame, E.

This latter frame rests upon the main frame A, and supports the corn-box G, which is covered by a lid, H, forming the seat for the driver.

Near the center of the bottom of the box G passes a shaft, $b$, having a bearing at its lower end, in a cross-bar, or other convenient device under the box in the frame E, and is, under the bottom of the box, provided with a wheel, I, which has cogs on its under side, around the periphery, which gear with a cog-wheel, J, upon the axle C.

On the upper end of the shaft $b$ is placed a disk, K, which rests upon the bottom of the box, and is of such size that it will project through a slot made in the rear side of the box, which is cut out on the outside, as shown in figs. 1 and 2.

The shaft $b$ being revolved by the cog-wheels I and J, causes the disk K also to revolve.

This disk is, near its periphery, provided with a series of holes, at equal distances apart, into which the corn will fall, and be carried around by the disk until directly over an opening in the bottom, at the rear end of the box, when a spring, $d$, pushes the grain of corn down through said opening.

Inside of the box G, at a suitable point, before the corn is deposited or pushed out by the spring, is placed a piece of sponge or a brush, L, for the purpose of preventing more than the desired amount of corn to pass out.

From the opening in the bottom of the box G a flexible tube, M, leads, and conducts the corn to the shovel N, to be deposited in the furrow.

The shovel or hoe N is pivoted between two bent bars O O, which are attached at their front ends to the inner sides of two beams P P, while their rear ends are connected.

The beams P P are pivoted or hinged under the front end of the main frame A, and have each a mortise cut through their rear ends.

In this mortise is inserted a bar, R, at the lower end of which a wheel, S, is attached.

The bar R is adjusted and held in the mortise on the beam P, by a set-screw, $e$, entering through the end of the beam, as shown in fig. 2.

When the wheels S S are raised up, the plow or shovel N will run deeper in the ground, and when they are lowered further from the beams P P, the furrow will be made shallower.

The shovel N is connected by a chain, $f$, to a bar, T, which is hinged at the rear end of the main frame A, and provided with a lever or handle, V.

By this lever the driver can turn the bar T so as to raise the shovel, with the beams and wheels, up from the ground, and at the same time the said bar will come under the rear end of the frame E, so as to raise it up, and thereby throw the wheel I out of gear with the wheel J, and thus stop the running or revolving of the disk K.

This machine may be constructed so as to plant more than one row of corn at the same time.

Having thus fully described my invention,

What I claim as new, and desire to secure by Letters Patent, is—

1. The arrangement of the beams P P, adjustable bars R R, with wheels S S, bent bars O O, and shovel or plow N, all constructed and arranged substantially as and for the purposes herein set forth.

2. The bar T, hinged to the frame A, and operating for the double purpose of raising the wheels S S and plow N out of the ground, and of raising the rear end of the frame E, to throw the corn-dropping mechanism out of gear, substantially as herein set forth.

3. The arrangement of the hopper G, with perforated plate K, sponge L, spring $d$, and cog I, upon the hinged frame E, with the frame A, hinged bar T, shaft C, with cog J, and chain $f$, connected to the rear end of the bars P, all as shown and described.

In testimony that I claim the foregoing, I have hereunto set my hand, this 21st day of May, 1870.

ROBERT ERDLY.

Witnesses:
SAML. ALLEMAN,
HORACE ALLEMAN.